J. MEYER.
CULTIVATOR ATTACHMENT.
APPLICATION FILED MAR. 12, 1910.

975,976.

Patented Nov. 15, 1910.

Witnesses
Lloyd W. Patch
A. A. Hammond

Inventor
John Meyer
By Lewis Bagger
His Attorneys

THE NORRIS PETERS CO., WASHINGTON, D. C.

UNITED STATES PATENT OFFICE.

JOHN MEYER, OF YUTON, ILLINOIS.

CULTIVATOR ATTACHMENT.

975,976.

Specification of Letters Patent. Patented Nov. 15, 1910.

Application filed March 12, 1910. Serial No. 548,883.

*To all whom it may concern:*

Be it known that I, JOHN MEYER, a citizen of the United States, residing at Yuton, in the county of McLean and State of Illinois, have invented certain new and useful Improvements in Cultivator Attachments, of which the following is a specification.

My invention relates to an improvement in cultivator attachments, and the object is to provide means for supporting the knives or blades at any elevation.

The invention consists in certain novel features of construction and combinations of parts which will be hereinafter described and pointed out in the claims.

Figure 1:
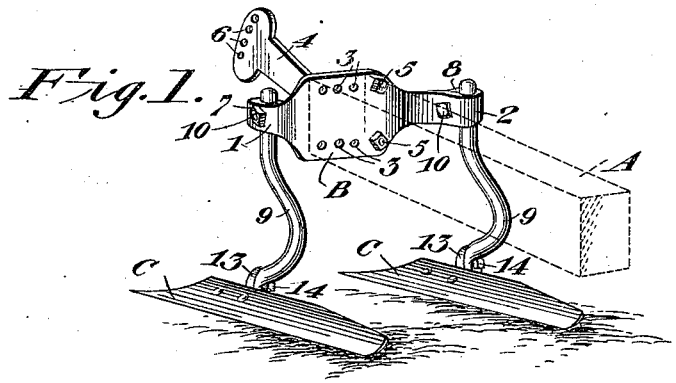
Figure 2:
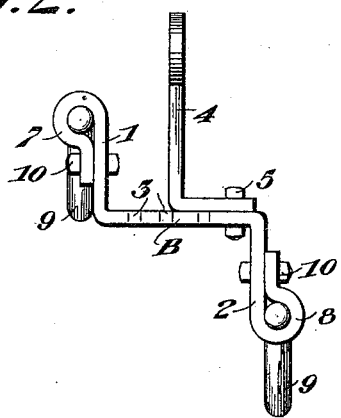
Figure 3:
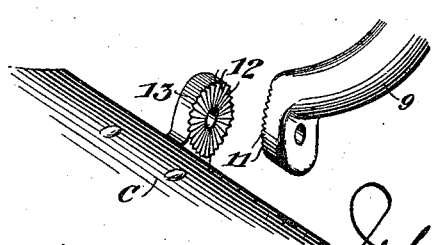

In the accompanying drawings:—Figure 1 is a perspective view showing the invention applied to the cultivator; Fig. 2 is a top plan view of the attachment; and Fig. 3 is a detail view of the pivotal connection between the shanks and knives.

A represents the beam of the cultivator, and B is the attachment or plate, which is practically Z-shaped, having arms 1 and 2, the arm 1 projecting forward, and the arm 2 projecting rearwardly. The plate is provided with a series of openings 3, through which bolts extend for connecting the plate to the beam. An angular member 4 is connected to the front of the plate by bolts 5. The member 4 being provided with openings 6 for the connection of the whiffletree or whiffletrees, not shown. The arms 1 and 2 are provided at their ends with resilient jaws 7 and 8 respectively, the jaws being formed by the ends of the arms being bent around to form a socket for the reception of the curved shanks 9. Bolts 10 pass through the jaws and arms for drawing the jaws toward the arms for locking the shank in the socket against movement. The shanks 9 are provided at their lower ends with teeth 11 which are adapted to engage the teeth 12 on the projections 13 of the blades C. The shanks 9 and projections 13 are provided with openings through which bolts 14 pass for locking the blades upon the shanks. The connection between the shanks and blades form a rosette whereby the blades can be adjusted to different angles. The shanks 9 are capable of a vertical adjustment through the sockets in the jaws 7 and 8 by simply releasing the jaws to allow the shanks to be moved. The shanks are also capable of being rotated in the sockets to obtain different angle adjustments for the blades C. The blades C are, therefore, capable of a vertical adjustment or an angular adjustment upon the movement of the shanks 9. They are also capable of further adjustment by the rosettes which allow the points of the blades to be thrown at different angles, due to the pivotal connection between the blades and shanks. The curved shanks allow the weeds, grass, and the like to pass between the shanks without choking up the passage.

Having fully described my invention, what I claim as new and desire to secure by Letters Patent, is:—

In a cultivator, the combination with a plate bent forwardly and rearwardly at its two ends, the intermediate portion adapted to be secured to the beam of the cultivator, said ends bent around upon themselves to form clamps, bolts for securing said ends, cultivator blades, shanks to which said blades are adjustably connected, the upper ends of said shanks held in the clamps, and means connected with the plate for applying draft thereto.

In testimony whereof I affix my signature, in the presence of two witnesses.

JOHN MEYER.

Witnesses:
CHARLES C. HOPKINS,
JOHN F. HAMMOND.